Sept. 25, 1945.   J. HOVORKA   2,385,516
BRAKE HITCH AND RELEASE
Filed Feb. 2, 1945   2 Sheets-Sheet 1

INVENTOR;
JAMES HOVORKA
BY *[signature]*
ATTORNEY

Sept. 25, 1945.  J. HOVORKA  2,385,516
BRAKE HITCH AND RELEASE
Filed Feb. 2, 1945  2 Sheets-Sheet 2

INVENTOR;
JAMES HOVORKA
BY *A. E. Fisher*
ATTORNEY

Patented Sept. 25, 1945

2,385,516

UNITED STATES PATENT OFFICE 2,385,516

BRAKE HITCH AND RELEASE

James Hovorka, Elizabeth, Ill.

Application February 2, 1945, Serial No. 575,757

4 Claims. (Cl. 188—142)

This invention relates to a brake hitch and release apparatus for mounting upon any conventional wagon equipped with standard forms of braking mechanisms, and this apparatus is designed to provide means for the automatic control of such a wagon in passing down a grade or incline and for braking the vehicle in such situation automatically by applying a reverse action or strain upon the tongue of the wagon as drawn by a team, or upon the tow-bar in case the wagon is drawn by a tractor or other motor vehicle.

One object of the invention therefore is to provide an apparatus of the kind referred to, whereby when a loaded wagon, drawn by a team or tractor passes onto a down-grade or incline, the conventional brakes of the vehicle will be automatically operated by such apparatus as installed upon the vehicle, by virtue of the arrangement of the connection between the drawn vehicle and the towing vehicle or team, and then when the drawn vehicle passes onto level ground again, or for any other reason it is desired to release the brakes, this may be readily accomplished by means of a control rope extended from a brake releasing arm or trigger of the apparatus to the hand of the driver.

A further object of the invention is to provide means in an automatic braking apparatus of the kind referred to, for neutralizing the said apparatus and rendering same inoperative, when the brakes are not desired for use.

With the foregoing objects in view, together with such other objects and advantages as may appear from the specification, a preferred embodiment of the invention as applied to a conventional form of wagon and the latter equipped with a standard form of brake mechanism, is shown in the accompanying drawings, wherein.

This invention is designed for mounting upon a conventional form of wagon chassis, as represented generally at 5, and including the front and rear axles 6, 7, wheels 8, and draw-bar 9, the axles being braced as at 10 to the draw-bar.

Figure 4:
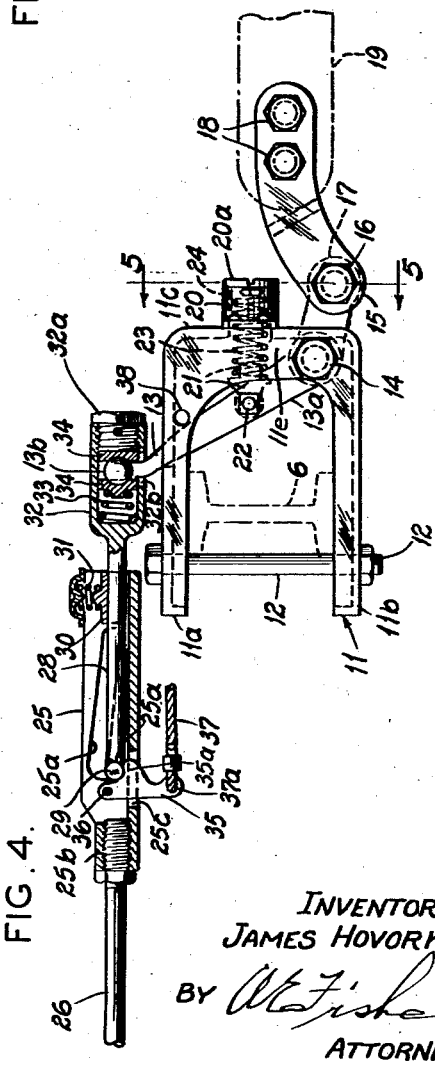
Figure 4 is a longitudinal vertical section on the line 4—4 of Figure 3.

The invention comprises a hitch frame or carrier 11, of suitably heavy sheet metal, bent, curved and formed as shown in Figure 4 to embrace at top and bottom the front axle 6 of the wagon chassis 5, and so as to provide thereat the top plate 11a, the bottom plate 11b and the frontal plate 11c, with the rear ends of the top and bottom plates projecting rearwardly of the axle 6 and the frontal plate spaced forwardly from the axle for providing the open space there shown. Thus positioned centrally over the axle 6, the frame or carrier 11 is firmly locked to the axle by means of heavy bolts 12 passed through the overlapping rear ends of the top and bottom plates 11a, 11b, and any conventional additional anchorage of these plates to the axle may be provided as thought desirable, the same being not here shown.

A bifurcated brake and release lever 13 is mounted through the frontal open space of the frame or carrier 11, and for this purpose the lower forked legs 13a of the lever are passed freely through slots 11d cut in laterally spaced relation through the base of the front plate 11c, while the upper and converged end or shank of the lever 13 is passed freely through a slot 11f formed centrally through the upper plate 11a, by which arrangement the lever is passed through the frame in an angular direction, inclined rearwardly from the basal slots of the front plate 11c. The lever is pivotally secured in this position by means of a cross bolt 14 which is passed transversely through the lateral webs 11e integrally extended from the frame 11. The upper shank of the lever 13 ends in the upstanding and rigidly connected ball bearing 13b, the purpose of which will be later pointed out.

A bilateral coupling 15 is pivotally bolted by the cross bolt 16 passed through the sides of the rear end thereof, to the forwardly extended ends of the legs 13a of the lever 13, the said bolt being passed through the intervening spacing sleeve 17. The coupling 15 is in turn bolted by means of the bolts 18 passed through the sides of its forward end, to a wagon tongue or tow-bar such as indicated at 19.

A pressure housing 20 is mounted medially to the outer face of the front plate 11c of the frame 11, immediately over an aperture formed through the plate at this point as indicated at 11g. A cylindrical stud 21 is pivoted at its inner end upon a pin 22 passed transversely and medially through the legs of the lever 13, in horizontal alignment with the housing 20, into which housing the free end of the stud is slidably passed. A compression spring 23 of coiled formation is seated over the stud 21 and also enters the housing 20 where it bears upon a movable washer 24. The open outer end of the housing is provided with a threaded adjustment plug which threadedly engages the housing, the said plug being indicated at 20a. By means of this plug and the inward bearing thereof upon the washer 24, the tension of the spring 23 may be regulated as desired, as also the tension and responsiveness of the brake lever 13 and associated elements. It is obvious that pressure in a rearward direction upon the tongue or tow-bar 19 will operate to throw the upper end of the lever 13 forwardly against the resilient action of the spring 23 within the housing 20. The plug 20a after adjustment as desired, may be releasably locked in place by means of a cotter pin (not shown) in conventional manner.

Figure 1:
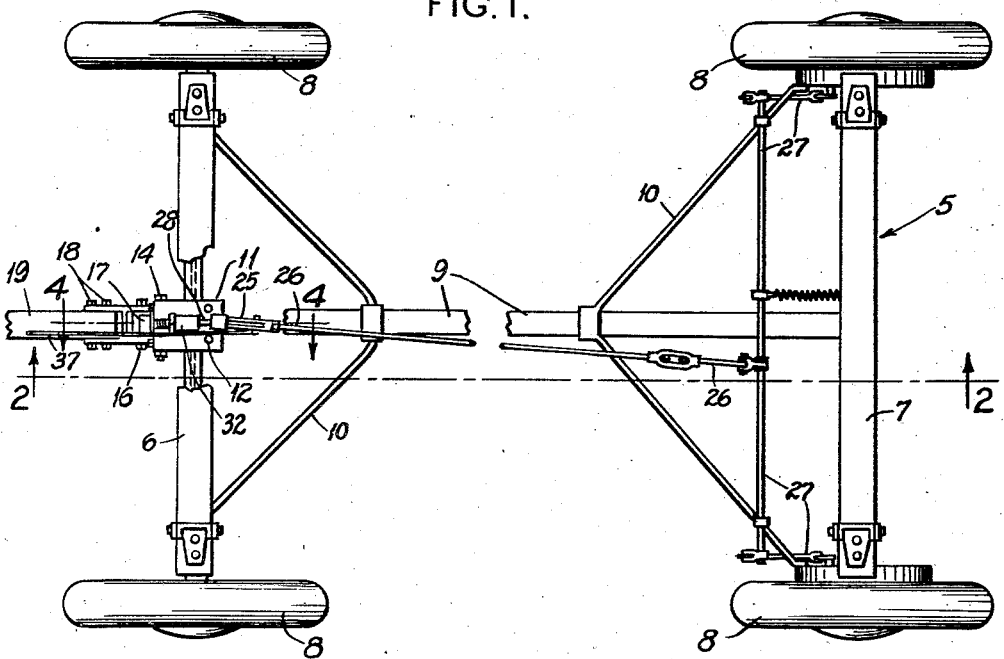
Figure 1 is a plan view of the frame or chassis of a wagon as equipped with a brake hitch and release apparatus constructed in accordance with this invention, a medial portion of the draw bar being broken away, as also the forward portion of the wagon tongue.
Figure 2:
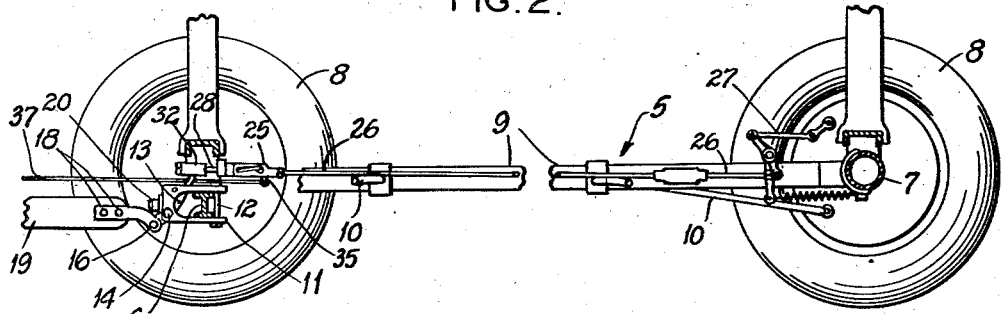
Figure 2 is a vertical section on the line 2—2 of Figure 1.
Figure 6:
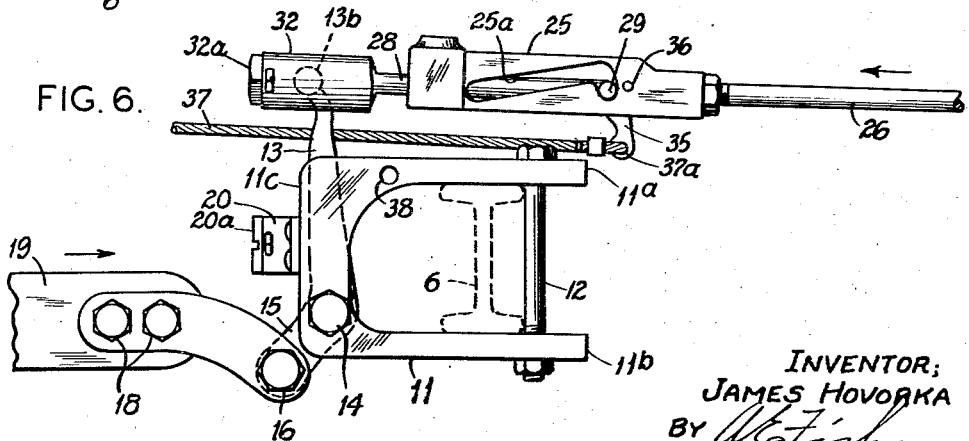
Figure 6 is a reversed side elevation of the assembly of Figure 4.
Figure 5:
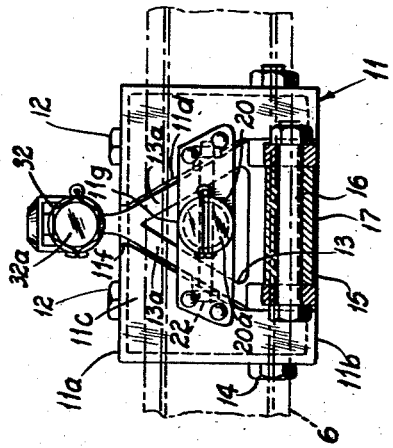
Figure 5 is a vertical cross-section on the line 5—5 of Figure 4.
Figure 3:
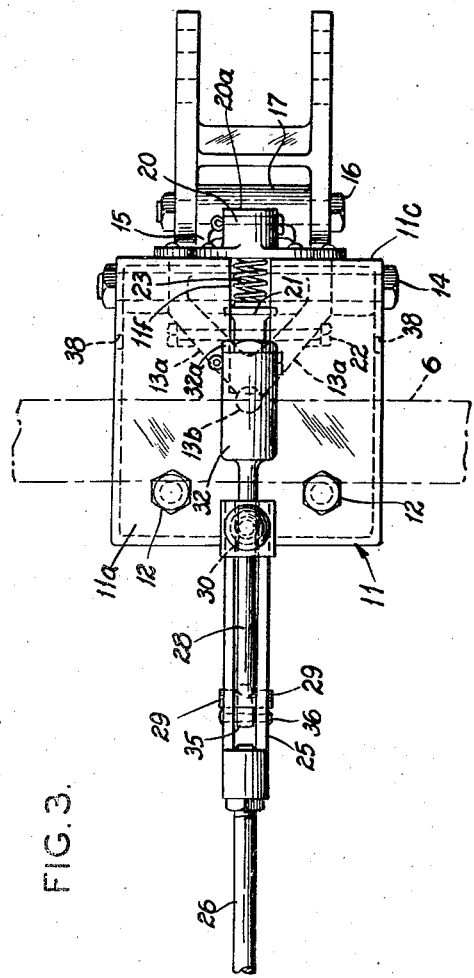
Figure 3 is a plan view on an enlarged scale of the brake hitch frame or carrier, the superposed hitch release frame or carrier, the tongue or tow-bar coupling and other associated elements.

An elongated and channeled hitch release frame or carrier 25 is positioned immediately above and in longitudinal alignment with the brake hitch frame or carrier 11, the same being U-shaped in cross-section and formed through its sides at the rear end thereof with transversely aligned L-shaped slots 25a, the short stems of the slots being turned downward and disposed rearwardly, as shown in Figure 4. The rear end of this frame 25 is provided with a threaded sleeve 25b for receiving the threaded forward end of the conventional brake rod 26, the rear end of which rod is operatively connected to the conventional brake rigging and mechanism 27 of the wagon, as shown in Figures 1 and 2.

A lock pin rod 28 is disposed freely within the channeled frame or carrier 25, both of these elements being extended horizontally, and this rod carries at its inner or rear end a short, transversely disposed lock pin 29 adapted to seat within the down-turned short stems of the L-shaped slots 25a, when the rod 28 is retracted rearwardly. This rod 28 is normally and resiliently pressed to its seat within the channel of the frame 25 by means of an arcuate (in cross section) pressure plate 30 which sits astride the forward end of the rod and is pressed downward by the spring 31 braced from the upper side of the frame as shown in Figure 4. The rod 28 is extended forwardly, and an elongated, cylindrical housing 32 is anchored at the end thereof in axial alignment therewith. This housing is closed at its free end by means of a screw adjustment plug 32a, and is slotted medially through its under side as shown at 32b in Figure 4 for receiving the ball bearing 13b of the lever 13. A compression spring 33 of coiled formation is seated within the inner end of this housing and is braced between that end and the adjacent cupped washer 34 at that side of the ball bearing 13b. The adjustment plug 32a bears against the opposite cupped washer 34 positioned at the opposite side of the ball bearing 13b, and provides means for regulating the tension of the spring 33 and the resulting stiffness or flexibility of movement of the lever 13 and its associated elements. Likewise the plug 32a may be locked by a cotter pin (not shown) in conventional manner.

A slot 25c is formed through the under side of the frame or carrier 25, at the rear end thereof, and a lock pin release arm or trigger 35 is passed up through this slot and is pivoted in place by means of a pin 36 passed transversely through the sides of the frame. This trigger is formed with a forwardly disposed, down-set shoulder 35a adapted to receive the lock pin 29 when the rod 28 is retracted and the ends of the pin at each side of the rod drop into the down-turned slots of the sides of the frame. An operating rope 37 is fastened at 37a to the lower pendant end of this arm or trigger 35 and is extended at its opposite end to the driver of the wagon or of the towing vehicle. A pull upon this rope serves to swing the shoulder 35a upward and to eject the lock pin 29 from its seat in the down-turned stems of the slots 25a.

As before stated the described apparatus is designed for wagons having the conventional built-in brake equipment, and the apparatus may be readily installed upon such wagons in manner pointed out.

In use and as the wagon descends a grade, the brakes may be applied automatically in manner already indicated, by means of imposing a reverse or "backing-up" stress upon the wagon tongue or tow-bar, thus throwing the lever 13 and ball bearing 13b forwardly, carrying with them the lock pin rod 28, the release frame 25 as interlocked with the rod 28, and the brake operating rod 26 which clamps the brakes to the rear wheels for slowing or stopping the vehicle. When the driver desires to release brake, he pulls upon the release rope 37, thus freeing the pin 29 which travels forward along the slots 25a, until the renewed forward movement of the wagon returns these elements to their normal braking position. In case the driver desires to back up his wagon, all he has to do is to continue the pull upon the release rope during the operation of backing. For neutralizing the apparatus and rendering same inoperative when desired for any purpose, a locking pin 38 may be passed through apertures in the lateral webs 11e of the frame 11, immediately in front of the lever 13 when the latter is in its retracted and inoperative position, thus locking that lever against such forward movement into operative position. Thus with this pin in place the wagon may be operated forwardly or may be backed up, without interference of the braking mechanism.

While I have here shown and described a certain embodiment of the invention, and specific structural features thereof, the apparatus may be changed or modified as desired in its structural details, not departing however from the essence of the invention as defined by the appended claims.

I claim:

1. In a device of the kind described for mounting upon a wagon having conventional brake equipment operable through a forward pull upon a brake rod, a hitch frame mounted centrally upon the front axle of the wagon, a brake and release lever extended angularly and vertically through the frame and pivotally pinned therein through a medial point of the lever for oscillating back and forth at its upper and lower ends, a tongue engaging coupling pivotally mounted at the lower extended end of the lever, a ball bearing at the upper extended end of the lever, an elongated and channeled hitch release frame positioned above the said hitch frame in horizontal and longitudinal alignment therewith, the rear end of the hitch release frame being connected with the forward end of the said brake rod, a lock pin rod disposed freely within the channel of the hitch release frame, a lock pin anchored transversely to the lock pin rod, the sides of the channeled hitch release frame being slotted in transverse alignment with down-turned portions thereof adapted to engage and seat the said lock pin at its ends to lock the movement of the connected rod, means controlled by a rope connected to said means and extended to the hand of the driver for ejecting the lock pin from said down-turned portions of the slots for freeing the lock pin rod for movement along its channel, and means at the forward end of the lock pin rod for engaging the said ball bearing of the brake and release lever.

2. In a device of the kind described for mounting upon a vehicle equipped with conventional brake apparatus, operable through a forward pull upon a brake rod, a brake and release lever pivotally supported, vertically across the front axle of the vehicle, through a medial point of the lever, and thus adapted to oscillate forwardly and rearwardly at its upper and lower ends, means for connecting the lower end of said lever with the rear end of a tongue or tow-bar, an elongated hitch release frame positioned horizontally and longitudinally above the said brake and release lever, means for connecting the rear end of the hitch release frame with the forward end of the brake rod, an operating rod slidably associated with the hitch release frame, means at the rear end of the operating rod for releasably locking the rod to the hitch release frame, said means being operable by means of a rope extended therefrom to the hand of the driver, and means at the forward end of the operating rod for engaging the upper end of the brake and release lever, whereby rearward stress imposed upon the lower end of the lever through the tongue or tow-rod will swing the upper end of the lever forwardly and with the operating rod in locked engagement with the hitch release frame will pull that frame forwardly and the brake rod forwardly, thus setting the brakes of the vehicle.

3. In a device of the kind described for mounting upon a wheel-borne vehicle including a conventional front axle and braking apparatus the latter including a forwardly extended brake rod operable through a forward pull thereon for setting the brakes, a hitch frame or carrier of suitably heavy sheet metal bent to provide top and bottom plates adapted to embrace the said front axle over the top and bottom sides thereof, with the bight portion of the frame disposed in spaced relation forwardly of the axle to provide operating space for mounting a brake and release lever therethrough, a bifurcated brake and release lever extended vertically through slots formed in the said top and bottom plates of the bight portion of the frame, a cross bolt passed transversely through lateral webs of the frame and through the said operating space forwardly of the axle and through the downwardly disposed forks of the brake and release lever, a bilateral coupling pivotally bolted at one end to the pendant ends of the brake and release lever the opposite end of said coupling being extended forwardly for engaging a tongue or tow-bar, a pressure housing mounted medially to the outer face of the bight of the hitch frame immediately over an aperture formed thereat in the frame, a stud pivoted at its rear end within the forks of the brake and release lever in horizontal alignment with the said housing, the free end of the stud being extended forwardly into the said housing, a coiled compression spring seated over the stud within the housing and braced at its ends between the outer end of the housing and the bight of the hitch frame, and means disposed above the hitch frame as mounted on the axle and operable by the upwardly extended end of the brake and release lever for pulling the said brake rod forwardly responsive to rearward stress imposed upon the lower forked ends of the brake and release lever through the said tongue or tow-bar.

4. In a device of the kind described for mounting upon a wheel-borne vehicle having a front axle and conventional braking apparatus, a brake and release lever vertically and pivotally supported athwart the axle through a medial portion of the lever, whereby the ends of the lever are free to oscillate forwardly and rearwardly, means for pivotally connecting the lower end of the lever to a tongue or tow-bar, means supported above the axle connected with and operable by the upper end of the lever for operating the said braking apparatus of the vehicle through rearward stress imposed upon the said tongue or tow-bar, said means comprising an elongated hitch release frame positioned horizontally and longitudinally of the vehicle, means for connecting the rear end of the hitch release frame with the braking apparatus, an operating rod slidably associated with the hitch release frame, means on the operating rod for releasably locking the rod to the hitch release frame, said locking means being operable by means of a rope extended therefrom to the hand of the driver, and means at the forward end of the operating rod for engaging the upper end of the brake and release lever, whereby the before mentioned rearward stress imposed upon the lower end of the lever through the connected tongue or tow-rod will operate the upper end of the brake and release lever and the connected operating rod for setting the brakes.

JAMES HOVORKA.